US012354533B2

(12) United States Patent
Furukawa et al.

(10) Patent No.: US 12,354,533 B2
(45) Date of Patent: Jul. 8, 2025

(54) DISPLAY DEVICE CAPABLE OF MEASURING DEGRADATION IN ONE SUB-PIXEL OUT OF TWO SUB-PIXELS

(71) Applicant: SHARP KABUSHIKI KAISHA, Osaka (JP)

(72) Inventors: Hiroyuki Furukawa, Sakai (JP); Masafumi Ueno, Sakai (JP); Chie Toridono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/574,065

(22) PCT Filed: Aug. 16, 2021

(86) PCT No.: PCT/JP2021/029858
§ 371 (c)(1),
(2) Date: Dec. 25, 2023

(87) PCT Pub. No.: WO2023/021539
PCT Pub. Date: Feb. 23, 2023

(65) Prior Publication Data

US 2024/0355271 A1 Oct. 24, 2024

(51) Int. Cl.
*G09G 3/32* (2016.01)

(52) U.S. Cl.
CPC ....... *G09G 3/32* (2013.01); *G09G 2300/0452* (2013.01); *G09G 2300/0842* (2013.01); *G09G 2320/043* (2013.01)

(58) Field of Classification Search
CPC .................. G09G 3/32; G09G 3/3233; G09G 2300/0452; G09G 2300/0842; G09G 2320/043
See application file for complete search history.

(56) References Cited

U.S. PATENT DOCUMENTS

| | | | | |
|---|---|---|---|---|
| 2010/0149077 | A1 | 6/2010 | Asano | |
| 2015/0170565 | A1 | 6/2015 | Hong et al. | |
| 2017/0294491 | A1 * | 10/2017 | Jo | H10K 59/131 |
| 2019/0206927 | A1 * | 7/2019 | Lee | H01L 33/08 |
| 2021/0225274 | A1 * | 7/2021 | Chu | G09G 3/3208 |
| 2021/0390911 | A1 * | 12/2021 | Kim | G09G 3/3266 |

FOREIGN PATENT DOCUMENTS

| | | | |
|---|---|---|---|
| JP | 2007072142 | A | 3/2007 |
| JP | 2010020154 | A | 1/2010 |
| JP | 2010141239 | A | 6/2010 |

* cited by examiner

*Primary Examiner* — Liliana Cerullo
(74) *Attorney, Agent, or Firm* — ScienBiziP, P.C.

(57) ABSTRACT

A display device includes: a display panel including a plurality of pixels each provided with a first subpixel and a second subpixel; a storage unit that stores degradation information indicating an amount of decrease in light emission efficiency of one of the first subpixel or the second subpixel; and a control unit that corrects an input video signal, input from outside, in accordance with the degradation information, and generates a video signal to be supplied to each of the first subpixel and the second subpixel.

10 Claims, 9 Drawing Sheets

DISPLAY DEVICE CAPABLE OF MEASURING DEGRADATION IN ONE SUB-PIXEL OUT OF TWO SUB-PIXELS

TECHNICAL FIELD

The present disclosure relates to a display device.

BACKGROUND ART

As to a display device having a light-emitting element in a pixel, the pixel suffers a decrease in light emission efficiency because of, for example, aging degradation. Hence, in accordance with degradation information obtained through measurement of the light emission efficiency of the pixel, the display device performs degradation compensation to correct a video signal to be supplied to the pixel. In Patent Document 1, an organic electroluminescence (EL) element for a monitor is provided with a light-receiving element. In accordance with the amount of light received with by light-receiving element for the organic EL element for the monitor, a grayscale of the image data is corrected. Furthermore, display devices developed in recent years have a plurality of subpixels per pixel.

CITATION LIST

Patent Literature

[Patent Document 1] Japanese Unexamined Patent Application Publication No. 2010-141239

SUMMARY

Technical Problem

As to a display device having a plurality of subpixels per pixel, when the light emission efficiency is measured for each of the plurality of subpixels, the amount of data is large on degradation information obtained through the measurement. As a result, a storage unit has to have a large capacity to store the measured and obtained degradation information. An aspect of the present disclosure is set out to reduce an increase in the amount of data on degradation information to be stored in a storage unit, and to compensate degradation for a display device having a plurality of subpixels per pixel.

Solution to Problem

A display device according to an aspect of the present disclosure includes: a display panel including a plurality of pixels each provided with a first subpixel and a second subpixel; a storage unit that stores degradation information indicating an amount of decrease in light emission efficiency of one of the first subpixel or the second subpixel; and a control unit that corrects an input video signal, input from outside, in accordance with the degradation information, and generates a video signal to be supplied to each of the first subpixel and the second subpixel.

DESCRIPTION OF EMBODIMENT

Embodiment

Figure 1:
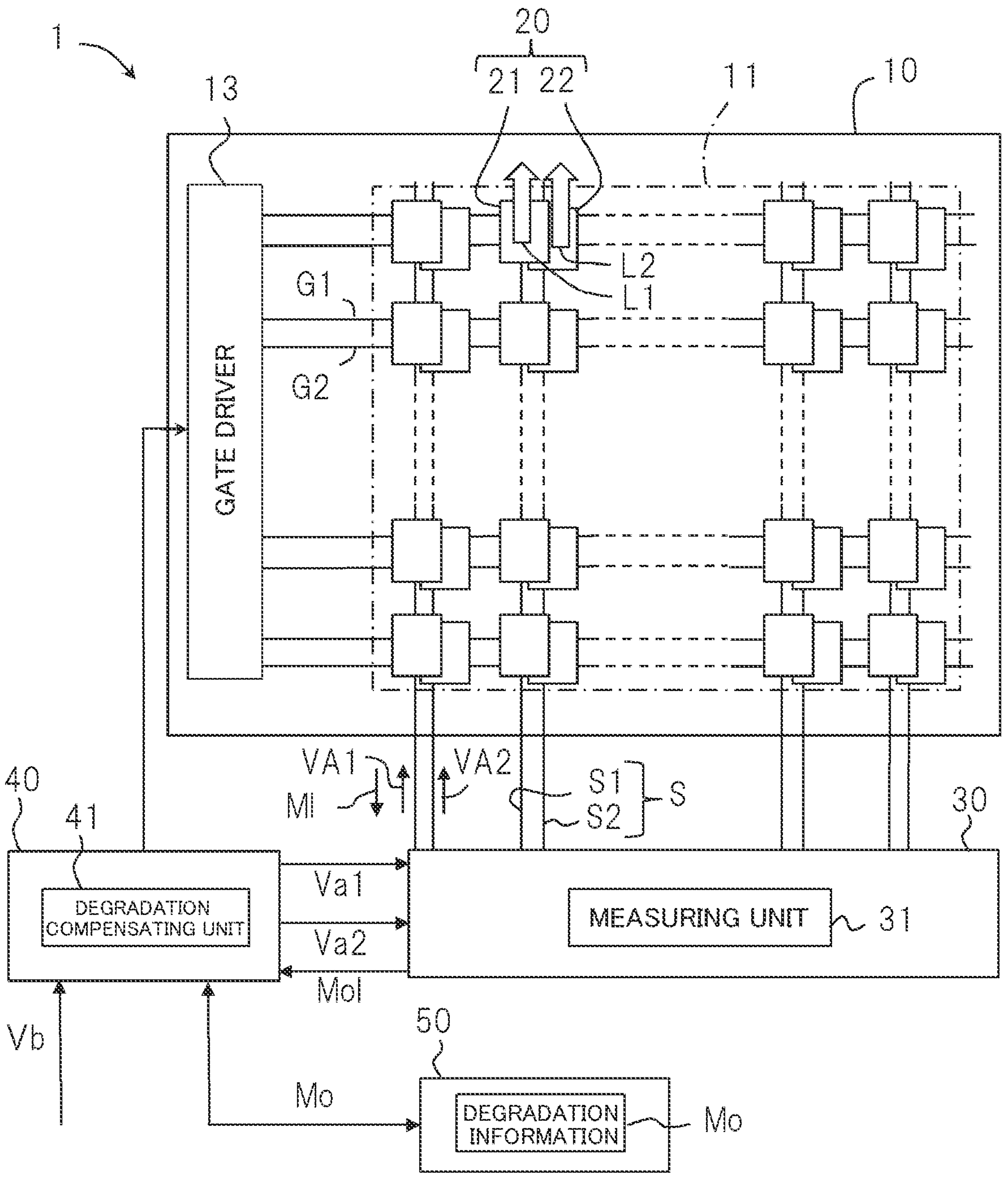
FIG. 1 is a drawing illustrating a schematic configuration of a display device according to an embodiment.

FIG. 1 is a drawing illustrating a schematic configuration of a display device 1 according to an embodiment. The display device 1 includes: a display panel 10; a source driver 30; a control unit 40; and a storage unit 50. The display panel 10 has: a plurality of pixels 20; a gate driver 13; a plurality of gate lines G1; a plurality of monitor control lines G2; and a plurality of data lines S. For example, the source driver 30 includes a measuring unit 31. For example, the control unit 40 includes a degradation compensating unit 41.

The plurality of pixels 20 are arranged in a matrix in a display region 11 included in the display panel 10 and displaying an image. Each of the plurality of pixels 20 has a plurality of subpixels. For example, each of the plurality of pixels 20 has a first subpixel 21 and a second subpixel 22. Each of the first subpixel 21 and the second subpixel 22 includes a self-luminous light-emitting element. In each of the first subpixel 21 and the second subpixel 22, the light-emitting element conducts a current to emit light. The first subpixel 21 and the second subpixel 22 will be described later with reference to, for example, FIG. 2.

Here, an upper limit would be set to the amount of a current running in the light-emitting element and in a drive transistor connected to the light-emitting element, and a constraint would be observed on light emission efficiency of the light-emitting element. Hence, as to a display panel not provided with a plurality of subpixels per pixel; in other words, as to a display panel provided with only one light-emitting element per pixel, an upper limit would be set to the amount of a current running in one light-emitting element provided for each of the pixels, and a constraint would be observed on light emission efficiency of one light-emitting element provided for each of the pixels. Such problems pose a difficulty in increasing luminance of each pixel.

On the other hand, as to the display device 1 according to this embodiment, the display panel 10 includes the plurality of pixels 20 each of which is provided with the first subpixel 21 and the second subpixel 22. Thus, as to the display device 1, the display panel 10 allows each of the plurality of pixels 20 to produce high luminance, compared with a display panel including a plurality of pixels each of which is not provided with a plurality of subpixels.

For example, as will be described later with reference to, for example, FIG. 2, the display device 1 has: a plurality of light-emitting elements (e.g., a first light-emitting element D11 and a second light-emitting element D21 illustrated in FIG. 2); and a plurality of drive transistors (e.g., a drive transistor Tr12 and a drive transistor Tr22 illustrated in FIG. 2). The light-emitting elements and the drive transistors are provided for each of the plurality of pixels 20. Hence, compared with a display panel having only one light-emitting element and only one drive transistor per pixel, the display device 1 can increase the total amount of current running in a plurality of light-emitting elements and the total amount of current running in a plurality of drive transistors. Thus, as to the display device 1, the display panel 10 allows each pixel 20 to produce high luminance. As a result, the display device 1 can display a high quality image.

In this embodiment, the first subpixel 21 and the second subpixel 22 are, for example, stacked on top of another. For example, of the first subpixel 21 and the second subpixel 22, the first subpixel 21 is provided above the second subpixel 22. The first subpixel 21 emits a light ray L1, and the second subpixel 22 emits a light ray L2. Light emitted from one pixel 20 is a mixture of the light ray L1 and the light ray L2. The first subpixel 21 and the second subpixel 22 emit the light ray L1 and the light ray L2 in the same direction.

For example, if the first subpixel 21 stacked above has a visible light transmittance of 50%, the luminance of each pixel 20 can be approximately 1.5 times higher than the luminance of a monolayer pixel (a pixel not having a plurality of subpixels).

This embodiment exemplifies a case where both the first subpixel 21 and the second subpixel 22 are top-emission subpixels. That is, of the first subpixel 21 and the second subpixel 22, the second subpixel 22 provided below emits the light ray L2. The light ray L2 passes through, and travels out of, the first subpixel 21. Note that neither the first subpixel 21 nor the second subpixel 22 shall be limited to a top-emission subpixel. Both of the subpixels may be bottom-emission subpixels.

For example, in each of the plurality of pixels 20, the first subpixel 21 and the second subpixel 22 provided to one pixel 20 emit light in the same color. That is, for example, the light ray L1 emitted from the first subpixel 21 and the light ray L2 emitted from the second subpixel 22 may have the same color. Hence, the luminance of the light rays in the same color can be increased by the light ray L1 emitted from the first subpixel 21 and by the light ray L2 emitted from the second subpixel 22.

The plurality of pixels 20 may include, for example, a pixel 20 that emits a red light, a pixel 20 that emits a green light, a pixel 20 that emits a blue light, and a pixel 20 that emits a yellow light. In other words, for example, both the light ray L1 emitted from the first subpixel 21 and the light ray L2 emitted from the second subpixel 22 may be any of red lights, green lights, blue lights, or yellow lights.

Note that, for example, a red light has a peak wavelength of more than 600 nm and 780 nm or less. Furthermore, for example, a green light has a peak wavelength of more than 500 nm and 600 nm or less. Moreover, for example, a blue light has a peak wavelength of 400 nm or more and 500 nm or less. In addition, for example, a yellow light has a peak wavelength of 550 nm or more and 590 nm or less.

Furthermore, the number of subpixels included in one pixel 20 shall not be limited to two. Three or more subpixels may be included in one pixel 20.

The display panel 10 displays an image in the display region 11 when, for example, the plurality of pixels 20 emit light. Examples of the display panel 10 include an organic electroluminescence (EL) display panel in which organic light-emitting diodes (OLEDs) are used as light-emitting elements, and a quantum-dot light-emitting-diode (QLED) display panel in which QLEDs are used as light-emitting elements. Note that the display panel 10 may be a display panel including light-emitting elements, and shall not be limited to either an organic EL display panel or a QLED display panel.

Each of the plurality of gate lines G1 corresponds to an associated one of the plurality of monitor control lines G2. The plurality of gate lines G1 and the plurality of monitor control lines G2 extend substantially in parallel with one another. Each of the plurality of gate lines G1 is connected to the plurality of corresponding first subpixels 21 and the plurality of corresponding second subpixels 22. Each of the plurality of monitor control lines G2 is connected to either the plurality of corresponding first subpixels 21 or the plurality of corresponding second subpixels 22. This embodiment exemplifies a case where the plurality of monitor control lines G2 are connected to the plurality of corresponding first subpixels 21, but not connected to the plurality of corresponding second subpixels 22.

The plurality of data lines S extend to intersect with the plurality of gate lines G1 and the plurality of monitor control lines G2. Furthermore, each of the plurality of data lines S includes a first data line S1 connected to first subpixels 21 and a second data line S2 connected to second subpixels 22. Each of a plurality of the first data lines S1 corresponds to an associated one of a plurality of the second data lines S2. The plurality of first data lines S1 and the plurality of second data lines S2 extend substantially in parallel with one another.

The plurality of pixels 20 are provided to respective intersections of: the plurality of data lines S; and the plurality of gate lines G1 and the plurality of monitor control lines G2. Specifically, the plurality of first subpixels 21 are provided to respective intersections of: the plurality of first data lines S1; and the plurality of gate lines G1 and the plurality of monitor control lines G2. Furthermore, the plurality of second subpixels 22 are provided to respective intersections of: the plurality of second data lines S2; and the plurality of gate lines G1.

The gate driver 13 may be provided to, for example, a substrate of the display panel 10. Alternatively, the gate driver 13 may be provided out of the substrate of the display panel 10. To the gate driver 13, each of the plurality of gate lines G1 and monitor control lines G2 is connected at one end. The gate driver 13 includes, for example, a shift register and a logic circuit. The gate driver 13 drives each of the plurality of gate lines G1 and monitor control lines G2 in accordance with a gate control signal output from the control unit 40.

The gate driver 13 outputs a scanning signal, used for selecting a plurality of pixels 20 for each row, to each of the plurality of pixels 20 through the plurality of corresponding gate lines G1. Furthermore, in performing degradation monitoring, the gate driver 13 outputs a monitor control signal, used for selecting a plurality of pixels 20 for each row, to each of the plurality of pixels 20 through the plurality of corresponding monitor control lines G2. Note that the degradation monitoring involves measuring to obtain degradation information Mo indicating an amount of decrease in light emission efficiency for each of the plurality of pixels 20. The degradation monitoring will be described later in detail.

To the source driver 30, each of the plurality of data lines S is connected at one end. The source driver 30 drives each of the plurality pixels 20 through the plurality of data lines S, in accordance with a source control signal output from the control unit 40. For example, the source driver 30 obtains from the control unit 40 a video signal Va1 to be supplied to each first subpixel 21. Then, in accordance with the video signal Va1 that is a digital signal, the source driver 30 generates a video signal voltage VA1 that is an analog signal (a grayscale voltage), and supplies the video signal voltage VA1 to each first data line S1. Furthermore, for example, the source driver 30 obtains from the control unit 40 a video signal Va2 to be supplied to each second subpixel 22. Then, in accordance with the video signal Va2 that is a digital signal, the source driver 30 generates a video signal voltage VA2 that is an analog signal (a grayscale voltage), and supplies the video signal voltage VA2 to each second data line S2. Note that the video signals Va1 and Va2 supplied from the control unit 40 to the source driver 30 are an input video signal Vb that is input from outside to the control unit 40 and undergoes degradation compensation (correction) performed by the control unit 40 in accordance with the degradation information Mo.

Furthermore, in performing degradation monitoring, the measuring unit 31 of the source driver 30 measures, in accordance with an instruction from the control unit 40, a degradation monitoring current MI that is an analog signal output from one of a first data line S1 or a second data line S2. Then, the measuring unit 31 outputs to the control unit 40 a degradation monitoring current value MoI that is a measured value. For example, the measuring unit 31 may be a circuit having, for example, a switch transistor, an amplifier, and an AD converter. Note that the measuring unit 31 does not have to be included in the source driver 30, and may be provided out of the source driver 30.

Furthermore, the video signal voltage VA1 and the degradation monitoring current MI do not have to be transmitted through the same line, and may be transmitted through separate lines.

The control unit 40 controls operations of the gate driver 13 and the source driver 30 to display an image in the display region 11. Moreover, the degradation compensating unit 41 of the control unit 40 performs degradation monitoring and degradation compensation. The degradation compensating unit 41 of the control unit 40 corrects the input video signal Vb input from outside, in accordance with the degradation information Mo. Then, the degradation compensating unit 41 generates the video signal Va1 and the video signal Va2 to be respectively supplied to a first subpixel 21 and a second subpixel 22. Hence, the first subpixel 21 and the second subpixel 22 included in a pixel 20 are controlled in accordance with the same input video signal Vb.

The control unit 40 outputs a gate control signal to the gate driver 13 to control driving of the gate driver 13. Furthermore, the control unit 40 outputs a source control signal to the source driver 30 to control driving of the source driver 30.

The control unit 40 includes, for example: an image processing unit that processes an image; and a timing controller that controls operations of the gate driver 13 and the source driver 30. For example, the image processing unit can be a large scale integration (LSI) such as a graphics processing unit (GPU). For example, the timing controller can be an LSI. The degradation compensating unit 41 may include, for example, an arithmetic circuit that performs degradation monitoring and degradation compensation. The degradation compensating unit 41 may be included in, for example, the image processing unit.

Here, the plurality of pixels 20 suffers a decrease in light emission efficiency because of temperature change and aging degradation. Hence, the degradation compensating unit 41 performs degradation monitoring at a predetermined time point.

The degradation monitoring is processing performed by the degradation compensating unit 41 to sweep (to gradually raise) a degradation monitoring voltage and supply the degradation monitoring voltage to a first subpixel 21, and obtains as the degradation information Mo a degradation monitoring voltage value observed when the degradation monitoring current value MoI, which is output from the first subpixel 21 and measured by the measuring unit 31, indicates a predetermined value or more. The degradation compensating unit 41 obtains the degradation information Mo for each of the plurality of first subpixels 21, and stores the degradation information Mo in the storage unit 50.

Note that this embodiment exemplifies a case where the degradation compensating unit 41 monitors the degradation of the first subpixels 21 out of the first subpixels 21 and the second subpixels 22. Alternatively, the degradation compensating unit 41 may monitor the degradation of the second subpixels 22 out of the first subpixels 21 and the second subpixels 22.

Then, when the degradation compensating unit 41 obtains the input video signal Vb that is a video signal input from outside, the degradation compensation unit 41 performs degradation compensation on the input video signal Vb (i.e., corrects the input video signal Vb) in accordance with the degradation information Mo stored in the storage unit 50, and generates a video signal to be supplied to each of the plurality of pixels 20. Specifically, the degradation compensating unit 41 performs degradation compensation on the input video signal Vb to generate the video signal Va1 to be supplied to each first subpixel 21 and the video signal Va2 to be supplied to each second subpixel 22. Then, the degradation compensating unit 41 outputs the generated video signals Va1 and Va2 to the source driver 30. After that, as described above, the source driver 30 generates the video signal voltage VA1 in accordance with the video signal Va1, and supplies the video signal voltage VA1 to the first subpixel 21 through the first data line S1. Furthermore, the source driver 30 generates the video signal voltage VA2 in accordance with the video signal Va2, and supplies the video signal voltage VA2 to the second subpixel 22 through the second data line S2.

As can be seen, the degradation compensating unit 41 measures a current-voltage characteristic of one of the first subpixel 21 or the second subpixel 22 in order to obtain the degradation information Mo. Hence, the degradation compensating unit 41 can accurately determine an amount of decrease in light emission efficiency of one of the first subpixel 21 or the second subpixel 22, and can accurately perform the degradation compensation.

Note that the degradation compensating unit 41 may perform degradation monitoring at any given time. Examples of the time include a period while an image is displayed, a period of a vertical blanking interval, a time point immediately after the power of the display device 1 is turned ON, and a time point when the power of the display device 1 is turned OFF.

The storage unit 50 stores the degradation information Mo indicating an amount of decrease in light emission efficiency of one of the first subpixel 21 or the second subpixel 22. The storage unit 50 may be, for example, a flash memory. Note that the storage unit 50 shall not be limited to a flash memory. Alternatively, the storage unit 50 may be: a semiconductor memory such as a static random access memory (SRAM), a dynamic random access memory (DRAM), a read only memory (ROM), or a solid state drive (SSD); a resistor; a magnetic storage device such as a hard disk drive (HDD); or an optical storage device such as an optical disc device.

Figure 2:
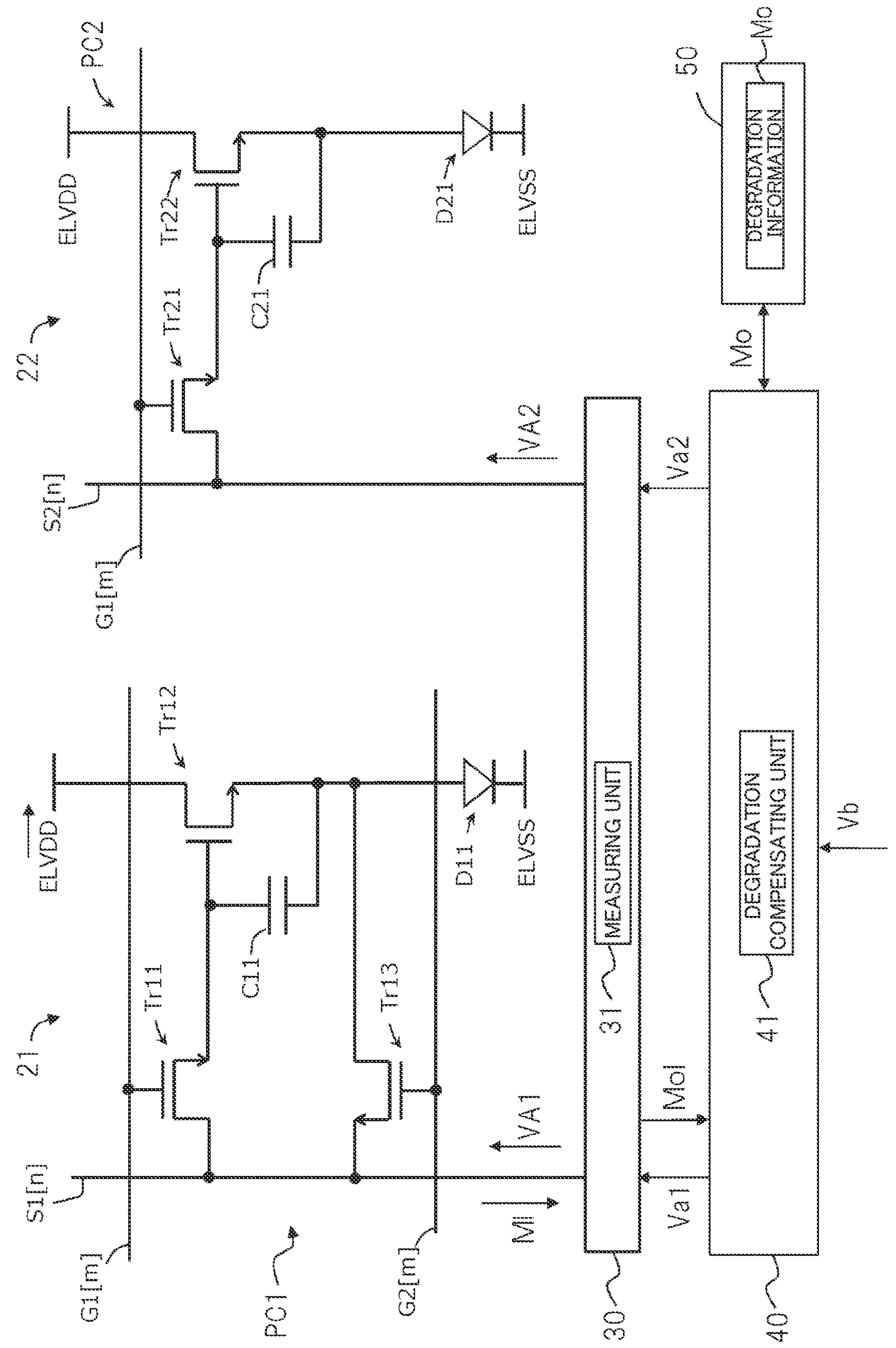
FIG. 2 is a drawing illustrating schematic configurations of respective pixel circuits included in a first subpixel and a second subpixel of the display device according to this embodiment.

Next, described with reference to FIG. 2 are respective pixel circuits included in a first subpixel 21 and a second subpixel 22. FIG. 2 is a drawing illustrating schematic configurations of respective pixel circuits included a first subpixel 21 and a second subpixel 22 of the display device 1 according to the embodiment. The first subpixel 21 has a pixel circuit PC1. The second subpixel 22 has a pixel circuit PC2. For example, of the pixel circuit PC1 and the pixel circuit PC2, only the pixel circuit PC1 is a pixel circuit to obtain the degradation information Mo.

Note that FIG. 2 illustrates: a pixel circuit PC1 connected to a gate line G1[m] in a m-th row, a monitor control line G2[m] in the m-th row, and a first data line S1[n] in an n-th column; and a pixel circuit PC2 connected to the gate line G1[m] in the m-th row and a second data line S2[n] in the n-th column. Note that each of n and m is an integer of 1 or more.

The pixel circuit PC1 includes: the first light-emitting element D11; a capacitor C11; a select transistor Tr11; the drive transistor Tr12; and a monitor control transistor Tr13. The pixel circuit PC2 includes: the second light-emitting element D21; a capacitor C21; a select transistor Tr21; and the drive transistor Tr22.

The first light-emitting element D11 and the second light-emitting element D21 are self-luminous elements such as organic light-emitting diodes (OLEDs) or quantum-dot light-emitting diodes (QLEDs). For example, as will be described later with reference to FIG. 3, the first light-emitting element D11 and the second light-emitting element D21 are stacked on top of another.

In the pixel circuit PC1, the capacitor C11 has: one terminal connected to a source terminal of the select transistor Tr11 and to a gate terminal of the drive transistor Tr12; and another terminal connected to a source terminal of the drive transistor Tr12, to an anode of the first light-emitting element D11, and to a drain terminal of the monitor control transistor Tr13. The first light-emitting element D11 has: the anode connected to the source terminal of the drive transistor Tr12, to the drain terminal of the monitor control transistor Tr13, and to the other terminal of the capacitor C11; and a cathode connected to a low-level power supply line ELVSS.

The select transistor Tr11 is provided between: the first data line S1[n]; and the capacitor C11 and the gate terminal of the drive transistor Tr12. The select transistor Tr11 has: a gate terminal connected to the gate line G1[m]; a drain terminal connected to the first data line S1[n]; and the source terminal connected to the gate terminal of the drive transistor Tr12 and to the one terminal of the capacitor C11.

The drive transistor Tr12 is connected in series to the first light-emitting element D11. The drive transistor Tr12 has: the gate terminal connected to the source terminal of the select transistor Tr11 and to the one terminal of the capacitor C11; a drain terminal connected to a high-level power supply line ELVDD; and the source terminal connected to the anode of the first light-emitting element D11, to the other terminal of the capacitor C11, and to the drain terminal of the monitor control transistor Tr13.

The monitor control transistor Tr13 is provided between: the source terminal of the drive transistor Tr12 and the anode of the first light-emitting element D11; and the first data line S1[n]. The monitor control transistor Tr13 has: a gate terminal connected to the monitor control line G2[n]; the drain terminal connected to the source terminal of the drive transistor Tr12, to the other terminal of the capacitor C11, and to the anode of the first light-emitting element D11; and a source terminal connected to the first data line S1[n].

In the pixel circuit PC2, the capacitor C21 has: one terminal connected to a source terminal of the select transistor Tr21 and to a gate terminal of the drive transistor Tr22; and another terminal connected to a source terminal of the drive transistor Tr22, and to an anode of the first light-emitting element D11. The second light-emitting element D21 has: the anode connected to the source terminal of the drive transistor Tr22, and to the other terminal of the capacitor C21; and a cathode connected to the low-level power supply line EL VSS.

The select transistor Tr21 is provided between: the second data line S2[n]; and the capacitor C21 and the gate terminal of the drive transistor Tr22. The select transistor Tr21 has: a gate terminal connected to the gate line G1[m]; a drain terminal connected to the second data line S2[n]; and the source terminal connected to the gate terminal of the drive transistor Tr22 and to the one terminal of the capacitor C21.

The drive transistor Tr22 is connected in series to the second light-emitting element D21. The drive transistor Tr22 has: the gate terminal connected to the source terminal of the select transistor Tr21 and to the one terminal of the capacitor C21; a drain terminal connected to the high-level power supply line ELVDD; and the source terminal connected to the anode of the second light-emitting element D21 and to the other terminal of the capacitor C21.

Next, with reference to FIG. 2, operations of the pixel circuits PC1 and PC2 will be described. During an image display period, that is, a grayscale voltage write period, the gate line G1[m] is in an active state (a selected state) and the monitor control line G2[m] is in an inactive state (a non-selected state). Hence, each of the select transistors Tr11 and Tr21 is ON, and the monitor control transistor Tr13 is OFF.

Then, when the input video signal Vb is input from outside to the control unit 40, the control unit 40 performs degradation compensation (correction) on the input video signal Vb in accordance with the degradation information Mo stored in the storage unit 50, and generates the video signals Va1 and Va2 whose degradation has been compensated.

Then, in the pixel circuit PC1, in accordance with the video signal Va1 supplied by the control unit 40 to the source driver 30, the source driver 30 supplies the first data line S1[n] with the video signal voltage VA1 based on a target luminance of the first light-emitting element D11. In accordance with the video signal voltage VA1 supplied when the select transistor Tr11 is ON, a current runs between the drain terminal and the source terminal of the drive transistor Tr12. The current further runs between the anode and the cathode of the first light-emitting element D11. Thus, the first light-emitting element D11 emits light at the target luminance.

Furthermore, in the pixel circuit PC2, in accordance with the video signal Va2 supplied by the control unit 40 to the source driver 30, the source driver 30 supplies the second data line S2[n] with the video signal voltage VA2 based on a target luminance of the second light-emitting element D21.

In accordance with the video signal voltage VA2 supplied when the select transistor Tr21 is ON, a current runs between the drain terminal and the source terminal of the drive transistor Tr22. The current further runs between the anode and the cathode of the second light-emitting element D21. Thus, the second light-emitting element D21 emits light at the target luminance.

Hence, the display device 1 includes a plurality of drive transistors; namely, the drive transistors Tr12 and Tr22, per pixel 20. Compared with a display device that has only one drive transistor per pixel, the display device 1 can increase the total amount of current running in the plurality of drive transistors; namely, the drive transistors Tr12 and Tr22. In addition, the display device 1 includes a plurality of light-emitting elements; namely, the first light-emitting element D11 and the second light-emitting element D21, per pixel 20. Compared with a display device that has only one light-emitting element per pixel, the display device 1 can increase the total amount of current running in the plurality of light-emitting elements; namely, the first light-emitting element D11 and the second light-emitting element D21.

Hence, compared with a display device having only one light-emitting element and one drive transistor per pixel, the display device 1 can increase luminance per pixel 20. As a result, the display device 1 can display an image more brightly.

Furthermore, when degradation monitoring is performed, the pixel circuit PC1 out of the pixel circuit PC1 and the pixel circuit PC2 is driven. In performing the degradation monitoring, first, the gate line G1[m] is in an active state (a selected state), and the monitor control line G2[m] is in an inactive state (a non-selected state).

Then, through the source driver 30, the degradation compensating unit 41 supplies the first data line S1[m] with a degradation monitoring voltage used for measuring a current-voltage characteristic of the drive transistor Tr12. The supplied degradation monitoring voltage charges the capacitor C11. Hence, the drive transistor Tr 12 receives a current corresponding to the charging voltage of the capacitor C11.

Next, the gate line G1[m] is brought into an inactive state (a non-selected state), and the drive transistor Tr12 receives a current corresponding to the charge voltage of the capacitor C11. Then, the degradation compensating unit 41 stops supplying the degradation monitoring voltage supplied to the first data line S1[n]. After that, the degradation compensating unit 41 switches the source driver 30 to a current measurable mode.

Next, the monitor control line G2[m] is brought into an active state (a selected state), and the monitor control transistor Tr13 turns ON. As a result, the degradation monitoring current MI flows between the drain terminal and the source terminal of the drive transistor Tr12, does not flow to the first light-emitting element D11, flows between the drain terminal and the source terminal of the monitor control transistor Tr13, and flows through the first data line S1[n] to be supplied to the source driver 30. Then, the degradation monitoring current MI supplied to the source driver 30 is measured by the measuring unit 31, and the measured value is obtained as the degradation monitoring current value MoI. After that, the measuring unit 31 outputs the measured degradation monitoring current value MoI to the control unit 40. Hence, the degradation compensating unit 41 sweeps (gradually raises) a degradation monitoring voltage, and obtains as the degradation information Mo a degradation monitoring voltage value observed when the degradation monitoring current value MoI indicates a predetermined value or more. Then, the degradation compensating unit 41 stores the obtained degradation information Mo in the storage unit 50. The degradation compensating unit 41 obtains the degradation information Mo for each of the plurality of first subpixels 21, and stores the degradation information Mo in the storage unit 50.

The obtained degradation information Mo indicates a shift amount of a threshold voltage between the drain terminal and the source terminal of the drive transistor Tr12 for passing a current through the first light-emitting element D11. The shift amount is observed from an initial state. That is, the degradation information Mo is information indicating a current-voltage characteristic between the drain terminal and the source terminal of the drive transistor Tr12 for passing a current through the first light-emitting element D11. Hence, the degradation information Mo is understood as information indicating an amount of decrease in light emission efficiency of the pixel 20.

The control unit 40 according to this embodiment performs degradation monitoring to obtain the degradation information Mo from the pixel circuit PC 1 out of the pixel circuit PC1 and the pixel circuit PC2. Then, using the degradation information Mo obtained from the pixel circuit PC1 out of the pixel circuit PC1 and the pixel circuit PC2, the control unit 40 performs degradation compensation on the video signal Va1 and the video signal Va2 (video signals) to be respectively supplied to the pixel circuit PC1 and the pixel circuit PC2.

Note that the display device 1 may obtain information indicating the light emission efficiency of the first light-emitting element D11 in addition to information indicating a current-voltage characteristic between the drain terminal and the source terminal of the drive transistor Tr12. Hence, the display device 1 may obtain the information items as the degradation information Mo indicating an amount of decrease in the light emission efficiency of the pixel 20.

The information indicating the light emission efficiency of the first light-emitting element D11 may be obtained, for example, as described below. For example, first, the gate line G1[m] is in an active state (a selected state), and the monitor control line G2[m] is in an inactive state (a non-selected state). Then, when the degradation compensating unit 41 supplies the first data line S1[n] with a voltage (e.g., 0 V) for turning OFF the drive transistor Tr12, the drive transistor Tr12 turns OFF.

Next, the gate line G1[m] is brought into an inactive state (a non-selected state), and the drive transistor Tr12 is fixed in an OFF state. Then, the monitor control line G2[m] is brought into an active state (a selected state), and the monitor control transistor Tr13 turns ON.

Then, when the degradation compensating unit 41 supplies the first data line S1[n] with a degradation monitoring voltage for measuring a current-voltage characteristic of the first light-emitting element D11, the source driver 30 sends a current through the first data line S1[n], between the source terminal and the drain terminal of the monitor control transistor Tr13, and between the anode and the cathode of the first light-emitting element D11. Thus, the first light-emitting element D11 emits light. The measuring unit 31 measures the sent current. From the current value measured by the measuring unit 31, the degradation compensating unit 41 estimates the light emission efficiency of the first light-emitting element D11. Hence, the degradation compensating unit 41 obtains the above-described information indicating the light emission efficiency of the first light-emitting element D11.

Here, if, in a display device having a plurality of subpixels per pixel, the degradation information indicating an amount of decrease in light emission efficiency is measured for each of the plurality of subpixels, a required storage capacity inevitably increases to store the degradation information measured for each of the plurality of subpixels.

Hence, in the display device 1 according to this embodiment, the storage unit 50 stores the degradation information Mo indicating an amount of decrease in light emission efficiency of one of the first subpixel 21 or the second subpixel 22. Then, in accordance with the degradation information Mo stored in the storage unit 50, the degradation compensating unit 41 corrects the input video signal Vb input from outside, Thus, the degradation compensating unit 41 generates the video signal Va1 and the video signal Va2 to be respectively supplied to the first subpixel 21 and the second subpixel 22. Specifically, the degradation compensating unit 41 corrects the input video signal Vb in accordance with the degradation information Mo to generate the video signal Va1 to be supplied to the first subpixel 21 and the video signal Va2 to be supplied to the second subpixel 22.

As a result, the display device 1 having a first subpixel 21 and a second subpixel 22 per pixel 20 does not have to measure the degradation information Mo indicating an amount of decrease in light emission efficiency for each of the first subpixel 21 and the second subpixel 22 that are a plurality of subpixels. Hence, compared with a case where the degradation information is measured for each of the plurality of subpixels, the display device 1 can reduce the storage capacity required for the storage unit 50 to store the measured degradation information Mo. Such a feature makes it possible to curb an increase in the data amount of the degradation information Mo stored in the storage unit 50, and perform degradation compensation for the display device 1 having a plurality of subpixels; namely, a first subpixel 21 and a second subpixel 22 per pixel 20.

As can be seen, the first subpixel 21 and the second subpixel 22 included in a pixel 20 according to this embodiment are controlled in accordance with the same input video signal Vb. Hence, a correlation is found between degrees of degradation of the first subpixel 21 and the second subpixel 22 included in a pixel 20. For example, a pixel 20 whose first subpixel 21 is greatly degraded has the second subpixel 22 also greatly degraded. A pixel 20 whose first subpixel 21 is little degraded has the second subpixel 22 also little degraded. Hence, using the degradation information Mo on one of the first subpixel 21 or the second subpixel 22, both of the subpixels can receive the degradation compensation.

As can be seen, in this embodiment, the control unit 40 obtains, for each of the plurality of pixels 20, the degradation information Mo only on the first subpixel 21 out of the fist subpixel 21 and the second subpixel 22. As a result, an amount of data of the degradation information Mo can be reduced, compared with a case where the degradation information is obtained for each of the plurality of subpixels included in one pixel. Such a feature can reduce a storage capacity of the storage unit 50 for storing the degradation information Mo.

Furthermore, the degradation compensating unit 41 may perform an equal amount of correction on: the input video signal Vb in accordance with the degradation information Mo in order to generate the video signal Va1 to be supplied to the first subpixel 21; and the input video signal Vb in accordance with the degradation information Mo in order to generate the video signal Va2 to be supplied to the second subpixel 22. Hence, compared with a case where the correction is made in different amounts to the respective video signals to be supplied to the first subpixel and the second subpixel, such a feature can reduce the size of the degradation compensating unit 41.

Furthermore, the degradation compensating unit 41 corrects the input video signal Vb in accordance with the degradation information Mo, and obtains the video signals Va1 and Va2. The grayscale voltage indicated by the video signal Va1 and the grayscale voltage indicated by the video signal Va2 may be the same. Such a feature allows the first subpixel 21 and the second subpixel 22 to degrade in the same pace. Note that the statement "the grayscale voltages are the same" may be understood that the first subpixel 21 and the second subpixel 22 have the same grayscale level out of multiple levels representing the luminance of each of the first subpixel 21 and the second subpixel 22, in such a case where, for example, the luminance of each of the first subpixel 21 and the second subpixel 22 is represented by 256 levels of gray from the 0-level to the 255-level.

Figure 3:
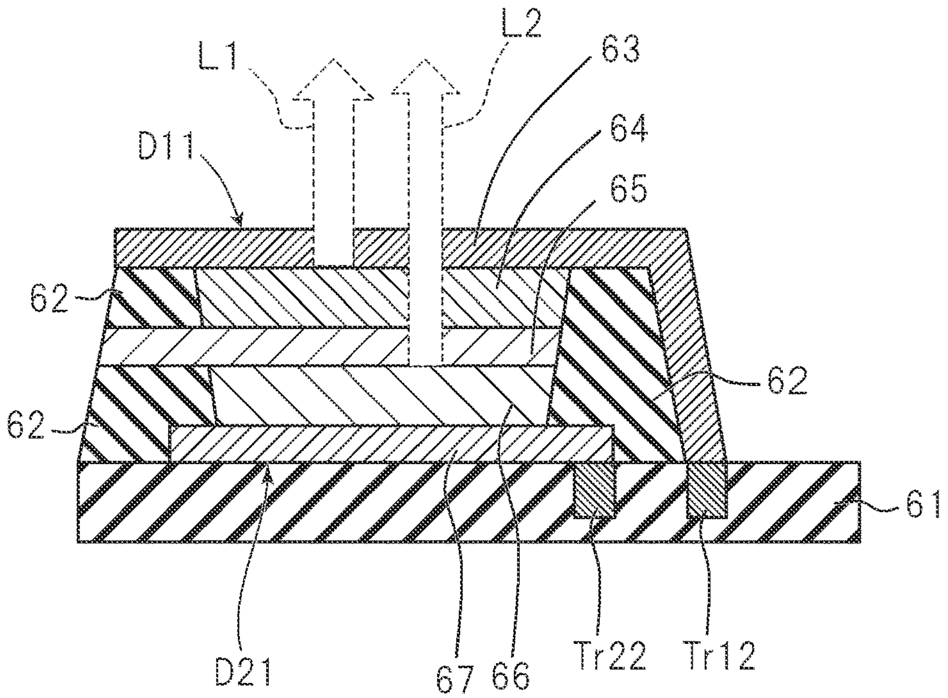
FIG. 3 is a cross-sectional view of a schematic structure of each of a first light-emitting element and a second light-emitting element according to the embodiment.

FIG. 3 is a cross-sectional view of a schematic structure of each of the first light-emitting element D11 and the second light-emitting element D12 according to the embodiment. The display device 1 includes: a substrate 61; and an edge cover 62. Above the substrate 61, the second light-emitting element D21 and the first light-emitting element D11 are sequentially stacked from toward the substrate 61.

The substrate 61 includes, for example: a base material formed of glass or resin; an insulating layer having a multilayer structure and provided on the base material; and circuit elements such as the drive transistors Tr12 and Tr22, and wires.

The edge cover 62 is provided on the substrate 61 to define peripheries of the first light-emitting element D11 and the second light-emitting element D21. For example, in plan view, the edge cover 62 is provided in a grid pattern in the display region 11 (see FIG. 1). The edge cover 62 is formed of, for example, a resin such as acrylic.

The first light-emitting element D11 includes, from a top layer (from a layer away from the substrate 61) to a bottom layer (a layer near the substrate 61): a first electrode 63; a first light-emitting layer 64; and a third electrode 65 in the stated order. The second light-emitting element D21 includes, from a top layer (from a layer away from the substrate 61) to a bottom layer (a layer near the substrate 61): the third electrode 65; a second light-emitting layer 66; and a second electrode 67 in the stated order.

For example, as to the first light-emitting element D11, the first light-emitting layer 64 emits light when a current runs between the first electrode 63 and the third electrode 65. That is, the first light-emitting element D11 is an electroluminescence (EL) light-emitting element. Furthermore, for example, as to the second light-emitting element D21, the second light-emitting layer 66 emits light when a current runs between the second electrode 67 and the third electrode 65. That is, the second light-emitting element D21 is an electroluminescence (EL) light-emitting element.

For example, in the first light-emitting element D11, the first electrode 63 is an anode and the third electrode 65 is a cathode. Moreover, for example, in the second light-emitting element D21, the second electrode 67 is an anode and the third electrode 65 is a cathode. In other words, the third electrode 65 is an electrode common to the first light-emitting element D11 and the second light-emitting element D21.

The first electrode 63 is provided to cover the first light-emitting layer 64 and the edge cover 62, routed from a top portion toward a base portion of the edge cover 62, and electrically connected to, for example, the drive transistor Tr12. The first electrode 63 is provided for each of the plurality of first light-emitting elements D11, and the driving of the first electrode 63 is controlled for each of the plurality of first light-emitting elements D11. The first electrode 63 is a transparent electrode formed of a transparent conductive material such as, for example, indium tin oxide (ITO). The first electrode 63 is transparent to visible light.

The second electrode 67 is provided on the substrate 61 and electrically connected to, for example, the drive transistor Tr22. The second electrode 67 is provided for each of the plurality of second light-emitting elements D21. The second electrode 67 has an edge covered with the edge cover 62. The driving of the second electrode 67 is controlled for each of the plurality of second light-emitting elements D21. The second electrode 67 is a reflective electrode formed of a metal material such as, for example, aluminum having a high reflectance. The second electrode 67 is reflective of visible light.

The third electrode 65 is provided between the first light-emitting layer 64 and the second light-emitting layer 66. In other words, the third electrode 65 is an electrode common to each of the plurality of the first light-emitting elements D11 and the plurality of the second light-emitting elements D21. The third electrode 65 is, for example, routed from a region surrounded with the edge cover 62 out of the region, and, through a wire, electrically connected to the low-level power supply line ELVSS (see FIG. 2). The third electrode 65 is a transparent electrode formed of a transparent conductive material such as, for example, indium tin oxide (ITO). The third electrode 65 is transparent to visible light.

The first light-emitting layer 64 is provided between the first electrode 63 and the third electrode 65. The second light-emitting layer 66 is provided between the second electrode 67 and the third electrode 65. That is, the first light-emitting layer 64 and the second light-emitting layer 66 are provided to the third electrode 65 across from each other.

Each of the first light-emitting layer 64 and the second light-emitting layer 66 contains, for example, an organic light-emitting material that emits light by EL. Furthermore, each of the first light-emitting layer 64 and the second light-emitting layer 66 contains, for example, electroluminescent quantum dots. The quantum dots contained in each of the first light-emitting layer 64 and the second light-emitting layer 66 may be, for example, semiconductor nanoparticles.

For example, in the first light-emitting element D11, holes are transported from the first electrode 63 to the first light-emitting layer 64, and electrons are transported from the third electrode 65 to the first light-emitting layer 64. Furthermore, for example, in the second light-emitting element D21, holes are transported from the second electrode 67 to the second light-emitting layer 66, and electrons are transported from the third electrode 65 to the second light-emitting layer 66.

Then, in each of the first light-emitting layer 64 and the second light-emitting layer 66, the transported holes and electrons recombine together to form excitons. The formed excitons emit light when the excitons are deactivated from an excited state to a ground state. Thus, the first light-emitting layer 64 emits the light ray L1, and the second light-emitting layer 66 emits the light ray L2. For example, the light ray L1 emitted from the first light-emitting layer 64 and the light ray L2 emitted from the second light-emitting layer 66 are light in the same color such as a red light, a green light, or a blue light.

Note that, in the first light-emitting element D11, a layer other than the first light-emitting layer 64 may be provided between the first electrode 63 and the third electrode 65. For example, between the first electrode 63 and the first light-emitting layer 64, at least one of a hole injection layer or a hole transport layer may be provided to increase efficiency in transporting the holes from the first electrode 63 to the first light-emitting layer 64. Furthermore, for example, between the third electrode 65 and the first light-emitting layer 64, at least one of an electron injection layer or an electron transport layer may be provided to increase efficiency in transporting the electrons from the third electrode 65 to the first light-emitting layer 64.

Moreover, in the second light-emitting element D21, a layer other than the second light-emitting layer 66 may be provided between the second electrode 67 and the third electrode 65. For example, between the second electrode 67 and the second light-emitting layer 66, at least one of a hole injection layer or a hole transport layer may be provided to increase efficiency in transporting the holes from the second electrode 67 to the second light-emitting layer 66. Furthermore, for example, between the third electrode 65 and the second light-emitting layer 66, at least one of an electron injection layer or an electron transport layer may be provided to increase efficiency in transporting the electrons from the third electrode 65 to the second light-emitting layer 66.

In addition, FIG. 3 illustrates an example in which the first light-emitting element D11 and the second light-emitting element D21 are top-emission light-emitting elements that emit the light ray L1 and the light ray L2 in a direction away from the substrate 61. However, the first light-emitting element D11 and the second light-emitting element D21 shall not be limited to top-emission light-emitting elements. The first light-emitting element D11 and the second light-emitting element D21 may be bottom-emission light-emitting elements that emit the light ray L1 and the light ray L2 in a direction toward the substrate 61, and that release the light ray L1 and the light ray L2 from a back surface of the substrate 61. If the first light-emitting element D11 and the second light-emitting element D21 are bottom-emission light-emitting elements, the first electrode 63 may be a reflective electrode, and each of the second electrode 67 and the third electrode 65 may be a transparent electrode.

As can be seen, the first light-emitting element D11 included in a first subpixel 21 and the second light-emitting element D21 included in a second subpixel 22 may be preferably stacked on top of another. Such a feature makes it possible to produce high luminance per pixel 20, compared with a display device provided with only one light-emitting element per pixel. As a result, the display device 1 can display a high quality image.

Note that each of the first light-emitting layer 64 and the second light-emitting layer 66 may be formed of the same material, or may be formed of a different material. Furthermore, for example, one of the first light-emitting element D11 or the second light-emitting element D21 may be relatively high in luminance when emitting light, and another one of the first light-emitting element D11 and the second light-emitting element D21 may have a relatively large viewing angle when emitting light.

Figure 4:
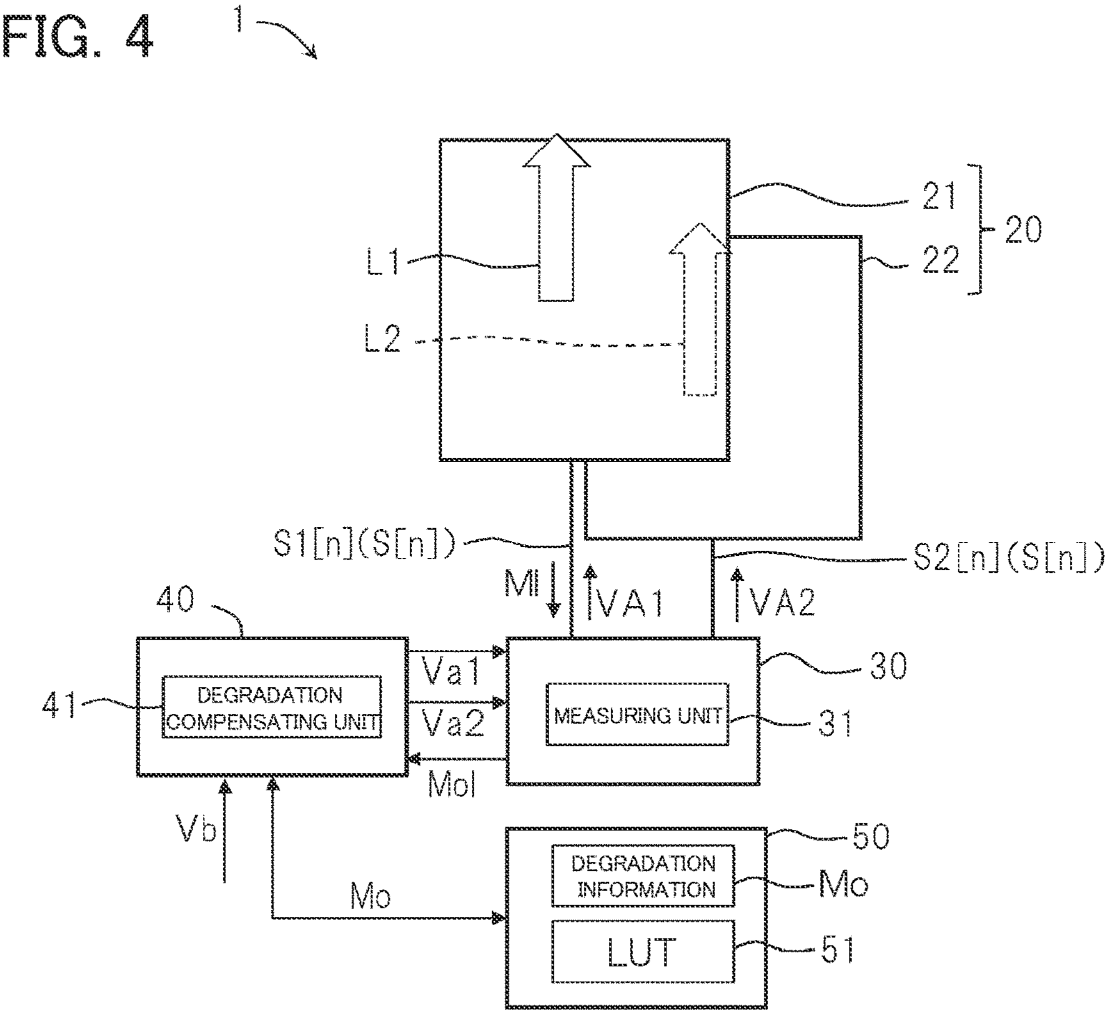
FIG. 4 is a drawing illustrating a schematic configuration of the display device according to a first modification of the embodiment.

FIG. 4 is a drawing illustrating a schematic configuration of the display device 1 according to a first modification of the embodiment. Note that FIG. 4 illustrates one of the plurality of pixels 20 connected to data lines S[n] in the n-th column. The display device 1 may perform a different amount of correction on: the input video signal Vb, using the degradation information Mo, in order to obtain the video signal Va1; and the input video signal Vb, using the degradation information Mo, in order to obtain the video signal Va2.

For example, an LUT 51 stores a correlation between: a shift amount ΔVth1 of a threshold voltage observed since an initial state and applied between the drain terminal and the source terminal of the drive transistor Tr12 (see FIG. 2) in a first subpixel 21; and a shift amount ΔVth2 of a threshold voltage observed since an initial state and applied between the drain terminal and the source terminal of the drive transistor Tr22 (see FIG. 2) in a second subpixel 22 (i.e., the LUT 51 stores a correlation of degradation characteristics between the drive transistor Tr12 and the drive transistor Tr22).

Figure 5:
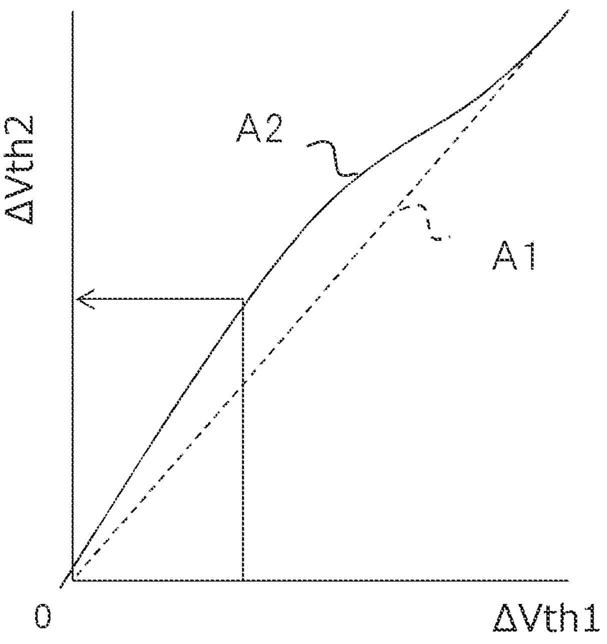
FIG. 5 is a graph illustrating a correlation between a shift amount ΔVth1 and a shift amount ΔVth2 according to the embodiment.

FIG. 5 is a graph illustrating a correlation between the shift amount ΔVth1 and the shift amount ΔVth2 according to the embodiment. In FIG. 5, a broken line A1 shows a correlation observed when the shift amount ΔVth1 and the shift amount ΔVth2 are the same. Furthermore, a solid line A2 shows a correlation observed when the shift amount ΔVth2 is greater than the shift amount ΔVth1. For example, data representing the correlation indicated by the solid line A2 is stored in the LUT51.

Then, when receiving the input video signal Vb, the degradation compensating unit 41 obtains the degradation information Mo stored in the storage unit 50. Then, in accordance with the degradation information Mo, the degradation compensating unit 41 corrects the input video signal Vb to generate the video signal Va1. Furthermore, with reference to the LUT 51 stored in the storage unit 50, the degradation compensating unit 41 obtains the shift amount ΔVth2 associated with the shift amount ΔVth1 equivalent to the obtained degradation information Mo. Then, in accordance with the degradation information Mo and the obtained shift amount ΔVth2, the degradation compensating unit 41 corrects the input video signal Vb to generate the video signal Va2. Then, the degradation compensating unit 41 outputs the generated video signals Va1 and Va2 to the source driver 30.

As can be seen, the degradation compensating unit 41 may perform, in accordance with the degradation information Mo, a different amount of correction on: the input video signal Vb when generating the video signal Va1 to be supplied to the first subpixel 21; and the input video signal Vb when generating the video signal Va2 to be supplied to the second subpixel 22. Thanks to such a feature, the generated video signals Va1 and Va2 can reflect more accurately degradation states of the first subpixel 21 and the second subpixel 22. As a result, the display device 1 can display a high quality image.

Note that the solid line A2 in FIG. 5 shows an example on the assumption that the degradation state of the second subpixel 22 progresses with respect to the first subpixel 21. However, a degree of the progress of the degradation state of the second subpixel 22 with respect to the first subpixel 21 depends on, for example, the layouts of the pixel 20 and the wires, and the heat radiation mechanism. Hence, the correlation between the shift amount ΔVth1 and the shift amount ΔVth2 shall not be limited to the example shown by the solid line A2 in FIG. 5.

Furthermore, for example, a larger amount of current may run in the second subpixel 22 provided below the first subpixel 21. Hence, the second subpixel 22 may emit light at a higher luminance than the second subpixel 22. In this case, the LUT 51 may calculate the shift amount ΔVth2 greater than the shift amount ΔVth1.

Figure 6:
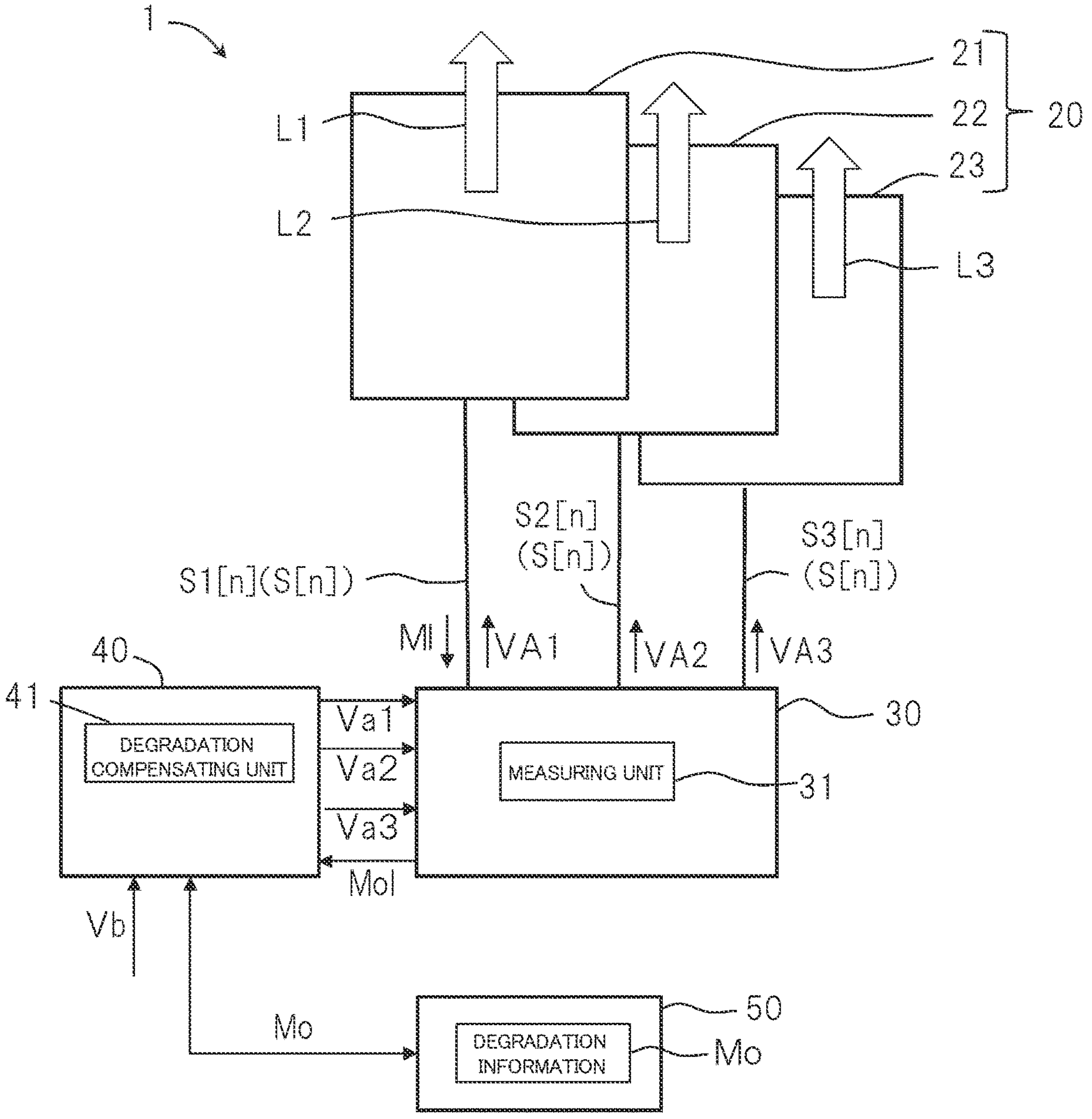
FIG. 6 is a drawing illustrating a schematic cross-section of a pixel of the display device according to a second modification of the embodiment.

FIG. 6 is a drawing illustrating a schematic cross-section of a pixel 20 of the display device 1 according to a second modification of the embodiment. Note that FIG. 6 illustrates one of the plurality of pixels 20 connected to data lines S[n] in the n-th column. Each of the plurality of pixels 20 may have three or more subpixels.

In the example illustrated in FIG. 6, each of the plurality of pixels 20 has a third subpixel 23 in addition to the first subpixel 21 and the second subpixel 22. The third subpixel 23 includes a self-luminous light-emitting element.

For example, the first subpixel 21, the second subpixel 22, and the third subpixel 23 are stacked on top of another. For example, the second subpixel 22 is provided below the first subpixel 21, and the third subpixel 23 is provided below the second subpixel 22. The first subpixel 21 emits the light ray L1, the second subpixel 22 emits the light ray L2, and the third subpixel emits a light ray L3. Light emitted from one pixel 20 is a sum (i.e., a mixture) of the light ray L1, the light ray L2, and the light ray L3. The light rays L1, L2, and L3 have the same color. For example, all of the light rays L1, L2, and L3 may be any of a red light, a green light, a blue light, or a yellow light.

The first subpixel 21, the second subpixel 22, and the third subpixel 23 emit the light rays L1, L2, and L3 in the same direction. The first subpixel 21, the second subpixel 22, and the third subpixel 23 may be either top-emission subpixels or bottom-emission subpixels.

The plurality of data lines S[n] include a third data line S3[n] connected to the third subpixel 23, in addition to the first data line S1[n] connected to the first subpixel 21 and the second data line S2[n] connected to the second subpixel 22.

Furthermore, in performing degradation monitoring, the measuring unit 31 measures the degradation monitoring current MI that is an analog signal output from the first data line S1[n] among the first data line S1[n], the second data line S2[n], and the third data line S3[n]. Then, the measuring unit 31 outputs the measured value; that is, the degradation monitoring current value MoI, to the control unit 40. Hence, the degradation compensating unit 41 stores in the storage unit 50 a degradation monitoring voltage value as the degradation information Mo observed when the degradation monitoring current value MoI indicates a predetermined value or more.

Then, when the degradation compensating unit 41 obtains the input video signal Vb that is a video signal input from outside, the degradation compensation unit 41 performs degradation compensation on the input video signal Vb (i.e., corrects the input video signal Vb) in accordance with the degradation information Mo stored in the storage unit 50, and generates a video signal to be supplied to each of the plurality of pixels 20. Specifically, the degradation compensating unit 41 performs degradation compensation on the input video signal Vb to generate: the video signal Va1 to be supplied to the first subpixel 21; the video signal Va2 to be supplied to the second subpixel 23; and a video signal Va3 to be supplied to the third subpixel 23. Then, the degradation compensating unit 41 supplies the generated video signals to the source driver 30.

Thus, the source driver 30: generates the video signal voltage VA1 in accordance with the video signal Va1, and supplies the generated video signal voltage VA1 to the first subpixel 21 through the first data line S1[n]; generates the video signal voltage VA2 in accordance with the video signal Va2, and supplies the generated video signal voltage VA2 to the second subpixel 22 through the second data line S2[n]; and generates a video signal voltage VA3 in accordance with the video signal Va3, and supplies the generated video signal voltage VA3 to the third subpixel 23 through the third data line S3[n].

Figure 7:
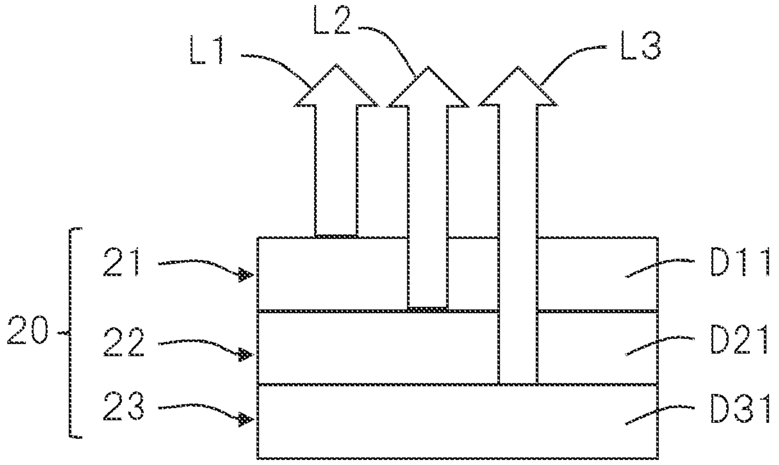
FIG. 7 is a cross-sectional view of a schematic structure of each of the first light-emitting element, the second light-emitting element, and a third light-emitting element according to the embodiment.

FIG. 7 is a cross-sectional view of a schematic structure of each of the first light-emitting element D11, the second light-emitting element D21, and a third light-emitting element D31 according to the embodiment. The third subpixel 23 includes the same pixel circuit as the pixel circuit PC2 (see FIG. 2) included in the second subpixel 22. That is, the third subpixel 23 includes the third light-emitting element D31. For example, the second light-emitting element D21 is provided below the first light-emitting element D11, and the third light-emitting element D31 is provided below the second light-emitting element D21. Then, the light emitted from the first light-emitting element D11 is released across from the second light-emitting element D21. Furthermore, the light ray L2 emitted from the second light-emitting element D21 is transmitted through the first light-emitting element D11 and released. Moreover, the light ray L3 emitted from the third light-emitting element D31 is transmitted through the second light-emitting element D21 and the first light-emitting element D11 and released.

Note that if the first light-emitting element D11, the second light-emitting element D21, and the third light-emitting element D31 are bottom-emission light-emitting elements, the light ray L1 emitted from the first light-emitting element D11 is transmitted through the second light-emitting element D21 and the third light-emitting element D31 and released. Furthermore, the light ray L2 emitted from the second light-emitting element D21 is transmitted through the third light-emitting element D31 and released. Moreover, the light ray L3 emitted from the third light-emitting element D31 is released across from the second light-emitting element D21.

Figure 8:
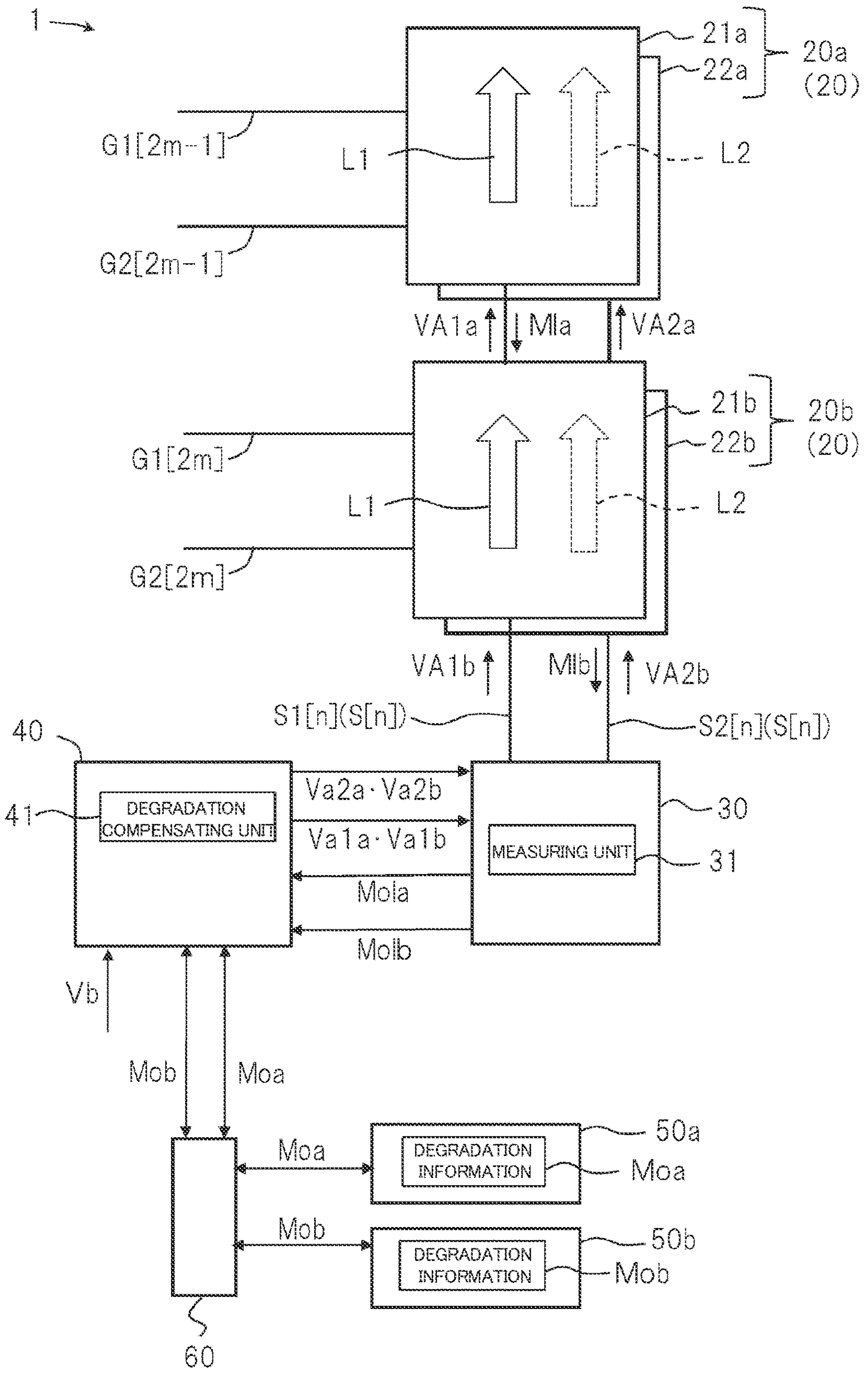
FIG. 8 is a drawing illustrating a schematic configuration of the display device according to a third modification of the embodiment.

FIG. 8 is a drawing illustrating a schematic configuration of the display device 1 according to a third modification of the embodiment. Note that FIG. 8 shows a pixel 20*a* among a plurality of pixels 20 (pixels in a first group) connected to a gate line G1[2*m*-1] in a [2m-1]-th row that is an odd-numbered row, and a pixel 20*b* among a plurality of pixels 20 (pixels in a second group) connected to a gate line G1[2*m*] in a [2m]-th row that is an even-numbered row. Note that, in the third modification, m is an integer of 1 or more, [2m-1] is an odd integer of 1 or more, and [2m] is an even integer of 2 or more.

Note that a plurality of the pixels 20*a* are connected to the gate line G1[2*m*-1] in the [2m-1]-th row that is an odd-numbered row, and each of the plurality of pixels 20*a* includes a first subpixel 21*a* and a second subpixel 22*a*. The first subpixel 21*a* is also connected to a monitor control line G2[2*m*-1] in the [2m-1]-th row that is an odd-numbered row. The second subpixel 22*a* is not connected to the monitor control line G2[2*m*-1]. Furthermore, a plurality of the pixels 20*b* are connected to the gate line G1[2*m*] in the [2m]-th row that is an even-numbered row, and each of the plurality of pixels 20*b* includes a first subpixel 21*b* and a second subpixel 22*b*. The first subpixel 21*b* is not connected to a monitor control line G2[2*m*] in the [2m]-th row that is an even-numbered row. The second subpixel 22*b* is connected to the monitor control line G2[2*m*] in the [2m]-th row that is an even-numbered row.

The display device 1 may obtain degradation information from different subpixels between the pixels in the first group (e.g., the plurality of pixels 20 connected to the gate line G1[2*m*-1] in the [2m-1]-th row that is an odd-numbered row) and the pixels in the second group (e.g., the plurality of pixels 20 connected to the gate line G1[2*m*] in the [2m]-th row that is an even-numbered row).

The display device 1 according to the third modification has a switch 60. Furthermore, the display device 1 according to the third modification has storage units 50*a* and 50*b* instead of the storage unit 50 (see FIG. 1). For example, each of the storage units 50*a* and 50*b* is a storage device smaller in storage capacity than the storage unit 50.

For example, when starting degradation monitoring, the degradation compensating unit 41 sweeps (gradually raises) a degradation monitoring voltage and supplies the degradation monitoring voltage to the first subpixel 21*a* of the pixel 20*a* connected to the gate line G1[2*m*-1] in the [2m-1]-th row that is an odd-numbered row. Then, the measuring unit 31 measures a degradation monitoring current MIa output from the first subpixel 21*a*, and obtains a degradation monitoring current value MoIa that is a measured value. The measuring unit 31 obtains as degradation information Moa a degradation monitoring voltage value observed when the degradation monitoring current value MoIa indicates a predetermined value or more.

Then, the degradation compensating unit 41 switches electrical connection states of the switch 60 so that the degradation compensating unit 41 and the storage unit 50*a* are electrically connected together through the switch 60. Hence, the degradation compensating unit 41 stores the degradation information Moa in the storage unit 50*a* through the switch 60.

Furthermore, the degradation compensating unit 41 sweeps (gradually raises) a degradation monitoring voltage and supplies the degradation monitoring voltage to the second subpixel 22*b* of the pixel 20*b* connected to the gate line G1[2*m*] in the [2m]-th row that is an even-numbered row. Then, the measuring unit 31 measures a degradation monitoring current MIb output from the second subpixel 22*b*, and obtains a degradation monitoring current value MoIb that is a measured value. The measuring unit 31 obtains as degradation information Mob a degradation monitoring voltage value observed when the degradation monitoring current value MoIb indicates a predetermined value or more.

Then, the degradation compensating unit 41 switches electrical connection states of the switch 60 from a state in which the degradation compensating unit 41 and the storage unit 50*a* are electrically connected together through the switch 60 to a state in which the degradation compensating unit 41 and the storage unit 50*b* are electrically connected together through the switch 60. Hence, the degradation compensating unit 41 stores the degradation information Mob in the storage unit 50*b* through the switch 60.

Furthermore, in performing degradation compensation, if the degradation compensating unit 41 performs degradation compensation to obtain a video signal to be supplied to the pixel 20*a* connected to the gate line G1[2*m*-1] in the [2m-1]-th row that is an odd-numbered row, the degradation compensating unit 41 switches electrical connection states of the switch 60 so that the degradation compensating unit 41 and the storage unit 50*a* are electrically connected together through the switch 60. Then, when the degradation compensating unit 41 obtains the input video signal Vb that is a video signal input from outside, the degradation compensation unit 41 performs degradation compensation on the input video signal Vb (i.e., corrects the input video signal Vb) in accordance with the degradation information Moa stored in the storage unit 50*a*, and generates a video signal to be supplied to each of the plurality of pixels 20*a*.

Specifically, the degradation compensating unit 41 performs degradation compensation on the input video signal Vb to generate a video signal Va1*a* to be supplied to the first subpixel 21*a* and a video signal Va2*a* to be supplied to the second subpixel 22*a*. Then, the degradation compensating unit 41 outputs the generated video signals Va1*a* and Va2*a* to the source driver 30.

Thus, the source driver 30 generates a video signal voltage VA1*a* that is an analog signal, in accordance with the video signal Va1*a*, and supplies, through the first data line S1[n], the video signal voltage VA1*a* to the first subpixel 21*a* connected to the gate line G1[2*m*-1] in the [2m-1]-th row that is an odd-numbered row. Furthermore, the source driver 30 generates a video signal voltage VA2*a* that is an analog signal, in accordance with the video signal Va2*a*, and supplies, through the second data line S2[n], the video signal voltage VA2*a* to the second subpixel 22*a* connected to the gate line G1[2*m*-1] in the [2m-1]-th row that is an odd-numbered row.

Moreover, if the degradation compensating unit 41 performs degradation compensation to obtain a video signal to be supplied to the pixel 20*b* connected to the gate line G1[2*m*] in the [2m]-th row that is an even-numbered row, the degradation compensating unit 41 switches electrical connection states of the switch 60 so that the degradation compensating unit 41 and the storage unit 50*b* are electrically connected together through the switch 60. Then, when the degradation compensating unit 41 obtains the input video signal Vb that is a video signal input from outside, the degradation compensation unit 41 performs degradation compensation on the input video signal Vb (i.e., corrects the input video signal Vb) in accordance with the degradation information Mob stored in the storage unit 50*b*, and generates a video signal to be supplied to each of the plurality of pixels 20*b*. Specifically, the degradation compensating unit 41 performs degradation compensation on the input video signal Vb to generate a video signal Va1*b* to be supplied to the first subpixel 21*b* and a video signal Va2*b* to be supplied to the second subpixel 22*b*. Then, the degradation compensating unit 41 outputs the generated video signals Va1*b* and Va2*b* to the source driver 30.

Thus, the source driver 30 generates a video signal voltage VA1*b* that is an analog signal, in accordance with the video signal Va1*b*, and supplies, through the first data line S1[n], the video signal voltage VA1*b* to the first subpixel 21*b* connected to the gate line G1[2*m*] in the [2m]-th row that is an even-numbered row. Furthermore, the source driver 30 generates a video signal voltage VA2*b* that is an analog signal, in accordance with the video signal Va2*b*, and supplies, through the second data line S2[n], the video signal voltage VA2*b* to the second subpixel 22*b* connected to the gate line G1[2*m*] in the [2m]-th row that is an even-numbered row.

As can be seen, between the pixel 20*a* in the first group and the pixel 20*b* in the second group among the plurality of pixels 20, the degradation compensating unit 41 may obtain the degradation information Moa and the degradation information Mob from a different subpixel between the first subpixels 21*a* and 21*b* and the second subpixels 22*a* and 22*b*. As a specific example, the pixel 20*a* in the first group is in a pixel group connected to the gate line G1[2*m*-1] in an odd-numbered row among the plurality of gate lines G1, and the pixels 20*b* in the second group is in a pixel group connected to the gate line G1[2*m*] in an even-numbered row among the plurality of gate lines G1.

As a result, compared with a case where the degradation information is obtained from all of the plurality of subpixels included in each of the plurality of pixels, such a feature can reduce a data amount of the degradation information Moa and the degradation information Mob, and can reduce a storage capacity for each of the storage unit 50*a* and the storage unit 50*b* respectively required to store the degradation information Moa and the degradation information Mob.

Noted that exemplified is a case where the pixel 20*a* in the first group is included in a pixel group connected to the gate line G1[2*m*-1] in an odd-numbered row and the pixel 20*b* in the second group is included in a pixel group connected to the gate line G1[2*m*] in an even-numbered row. However, the pixel 20*a* in the first group and the pixel 20*b* in the second group shall not be limited to such an example. For example, one of the first group including the pixel 20*a* or the second group including the pixel 20*b* may be a pixel group of a plurality of pixels 20 included in a region on the left half of the display region 11, and another one of the first group including the pixel 20*a* or the second group including the pixel 20*b* may be a pixel group of a plurality of pixels 20 included in a region on the right half of the display region 11.

Alternatively, for example, one of the first group including the pixel 20*a* or the second group including the pixel 20*b* may be a pixel group of a plurality of pixels 20 included in a region on the upper half of the display region 11, and another one of the first group including the pixel 20*a* or the second group including the pixel 20*b* may be a pixel group including a plurality of pixels 20 included in a region on the lower half of the display region 11.

Figure 9:
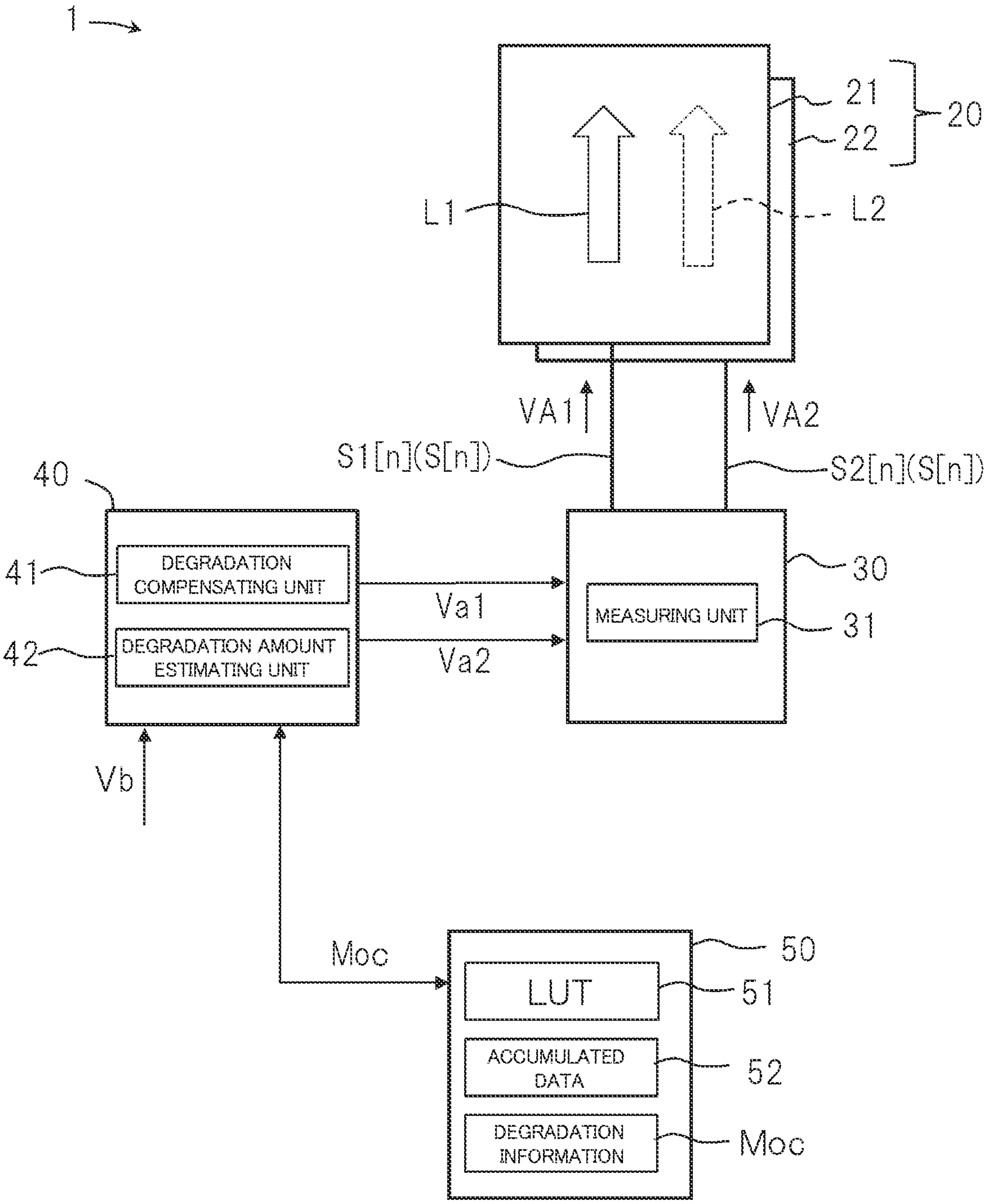
FIG. 9 is a drawing illustrating a schematic configuration of the display device according to a fourth modification of the embodiment.

FIG. 9 is a drawing illustrating a schematic configuration of the display device 1 according to a fourth modification of the embodiment. The display device 1 may estimate a degradation amount in accordance with the input video signal Vb in order to generate degradation information Moc, not to measure a current-voltage characteristic of one of the first subpixel 21 or the second subpixel 22 in order to obtain the degradation information.

In the display device 1 according to the fourth modification, the control unit 40 has a degradation amount estimating unit 42 in addition to the degradation compensating unit 41. Furthermore, for example, the storage unit 50 stores the degradation information Moc and the LUT 51.

When the input video signal Vb is input to the control unit 40, the degradation amount estimating unit 42 accumulates, in the storage unit 50 on a regular basis or an irregular basis, the input video signal Vb corresponding to one of the first subpixel 21 or the second subpixel 22. The storage unit 50 stores the input video signal Vb as accumulated data 52. Then, in accordance with the accumulated data 52 accumulated in the storage unit 50, the degradation amount estimating unit 42 estimates a degree of degradation of one of the first subpixel 21 or the second subpixel 22. For example, with reference to the accumulated data 52, the degradation amount estimating unit 42 calculates an integrated value obtained by integrating a grayscale voltage (e.g., the 255-level representing white) and the number of hours displayed at the grayscale voltage. Then, the degradation amount estimating unit 42 estimates an amount of decrease in light emission efficiency with respect to the integrated value. Then, the degradation amount estimating unit 42 obtains the degradation information Moc in accordance with the estimated amount of decrease in light emission efficiency, and stores the degradation information Moc in the storage unit 50.

Then, when receiving the input video signal Vb, the degradation compensating unit 41 corrects the input video signal Vb input from outside, in accordance with the degradation information Moc stored in the storage unit 50. Thus, the degradation compensating unit 41 generates the video signal Va1 and the video signal Va2 to be respectively supplied to the first subpixel 21 and the second subpixel 22. Note that, as described with reference to FIGS. 4 and 5, the degradation compensating unit 41 may perform, with reference to the LUT 51 in accordance with the degradation information Moc, a different amount of correction on: the input video signal Vb when generating the video signal Va1 to be supplied to the first subpixel 21; and the input video signal Vb when generating the video signal Va2 to be supplied to the second subpixel 22.

As can be seen, the degradation amount estimating unit 42 may predict the amount of decrease in light emission efficiency of one of the first subpixel 21 or the second subpixel 22 in accordance with the accumulated data 52 in which the input video signal Vb is accumulated, and obtain the degradation information Moc to be stored in the storage unit 50. Such a feature eliminates a need for actually measuring a current-voltage characteristic of one of the first subpixel 21 or the second subpixel 22, thereby successfully saving time required for degradation monitoring.

Note that the display device 1 according to the fourth modification does not have to perform degradation monitoring, and the plurality of monitor control lines G2 (see FIG. 1) may be omitted.

Figure 10:
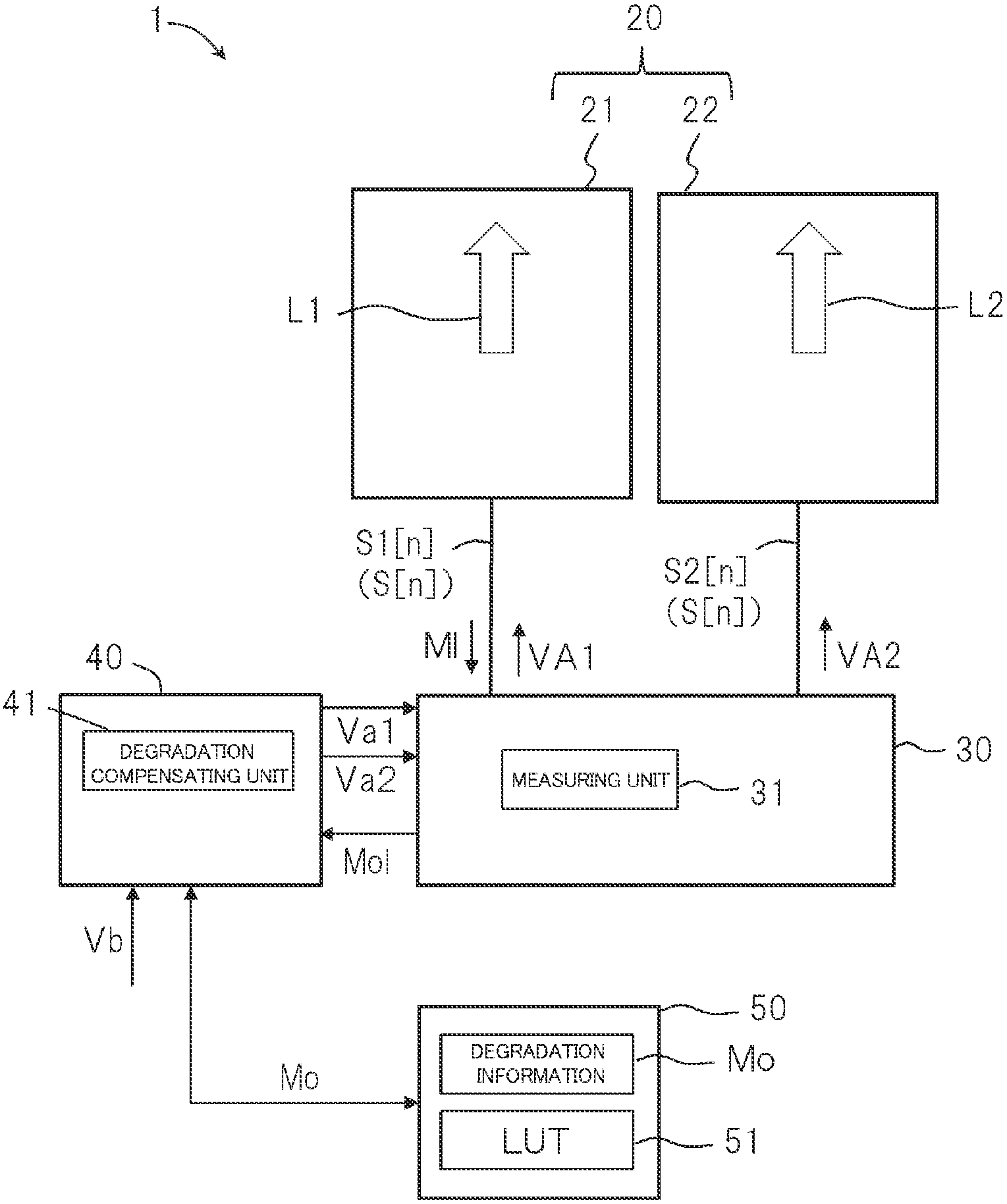
FIG. 10 is a drawing illustrating a schematic configuration of the display device according to a fifth modification of the embodiment.

FIG. 10 is a drawing illustrating a schematic configuration of the display device 1 according to a fifth modification of the embodiment. Note that FIG. 10 illustrates one of the plurality of pixels 20 connected to data lines S[n] in the n-th column. The first subpixel 21 and the second subpixel 22 included in each of the plurality of pixels 20 do not have to be stacked on top of another, and may be arranged side by side in plan view (when the display region 11 is viewed from the normal direction). The pixel 20 illustrated in FIG. 10 is referred to as a multipixel.

Thus, as to such a display device 1, the display panel 10 allows each of the plurality of pixels 20 to produce high luminance, compared with a display panel including a plurality of pixels each of which is not provided with a plurality of subpixels.

The light ray L1 emitted from the first subpixel 21 and the light ray L2 emitted from the second subpixel 22 are light in the same color such as a red light, a green light, a blue light, or a yellow light. Furthermore, for example, one of the first subpixel 21 or the second subpixel 22 may be relatively high in luminance when emitting light, and another one of the first subpixel 21 or the second subpixel 22 may have a relatively large viewing angle when emitting light.

Note that the storage unit 50 may be a computer-readable storage medium. The storage unit 50 may non-temporarily store a display program installed from an external storage medium of the display device 1 or from a server capable of communicating with the display device 1. The display program causes the control unit 40 to function as the degradation compensating unit 41 and the degradation amount estimating unit 42. The control unit 40 includes a computer as a hardware configuration. The computer may include a processor to execute the display program to cause the control unit 40 to function as the degradation compensating unit 41 and the degradation amount estimating unit 42. The processor may be any given kind of processor as long as the processor can execute the display program to implement the functions. The processor can be any given kind of processor such as a central processing unit (CPU), a graphics processing unit (GPU), a digital signal processor (DSP), or an application specific integrated circuit (ASIC). Furthermore, the processor may include a peripheral circuit device in addition to the CPU, the GPU, and the DSP. The peripheral circuit device may be an integrated circuit (IC) or may include a resistor and a capacitor.

Note that the elements introduced in the above-described embodiment and modifications may be appropriately combined as long as no contradiction occurs.

The invention claimed is:

1. A display device, comprising:

a display panel provided with a first pixel configured to emit light in a first color and a second pixel configured to emit light in a second color that is different from the first color, the first pixel including a first subpixel and a second subpixel that are configured to emit the light in the first color, and the second pixel including a third subpixel and a fourth subpixel that are configured to emit the light in the second color;

memory configured to store each of (i) first degradation information indicating an amount of decrease in light emission efficiency of one of the first subpixel or the second subpixel and (ii) second degradation information indicating an amount of decrease in light emission efficiency of one of the third subpixel or the fourth subpixel; and a controller configured to;

correct an input video signal that is input from outside in accordance with the first degradation information, generate a first video signal to be supplied to each of the first subpixel and the second subpixel, correct the input video signal in accordance with the second degradation information, and generate a second video signal to be supplied to each of the third subpixel and the fourth subpixel.

2. The display device according to claim 1, wherein the controller is further configured to measure current-voltage characteristic of one of the first subpixel or the second subpixel in order to obtain the first degradation information, and to measure a current-voltage characteristic of one of the third subpixel or the fourth subpixel in order to obtain the second degradation information.

3. The display device according to claim 1, wherein the controller is further configured to:

estimate the amount of decrease in the light emission efficiency of the one of the first subpixel or the second subpixel in accordance with accumulated data in which the input video signal is accumulated, obtain the first degradation information to be stored in the memory, estimate the amount of decrease in the light emission efficiency of the one of the third subpixel or the fourth subpixel in accordance with the accumulated data in which the input video signal is accumulated, and obtain the second degradation information to be stored in the memory.

4. The display device according to claim 1, wherein the first subpixel has a first light-emitting element, the second subpixel has a second light-emitting element, the third subpixel has a third light-emitting element, the fourth subpixel has a fourth light-emitting element, the first light-emitting element and the second light-emitting element are stacked on top of each other, and the third light-emitting element and the fourth light-emitting element are stacked on top of each other.

5. The display device according to claim 4, wherein the controller is further configured to obtain, for the first pixel, the first degradation information only on the first subpixel out of the first subpixel and the second subpixel, and to obtain, for the second pixel, the second degradation information only on the third subpixel out of the third subpixel and the fourth subpixel.

6. The display device according to claim 5, wherein the controller is further configured to perform, in accordance with the first degradation information, a different amount of correction on:

the input video signal when generating the first video signal to be supplied to the first subpixel, and the input video signal when generating the first video signal to be supplied to the second subpixel, and the controller is further configured to perform, in accordance with the second degradation information, a different amount of correction on:

the input video signal when generating the second video signal to be supplied to the third subpixel, and the input video signal when generating the second video signal to be supplied to the fourth subpixel.

7. The display device according to claim 1, wherein the display panel includes:

a plurality of first pixels, including the first pixel;

a plurality of second pixels, including the second pixel; and a plurality of gate lines, each connected to a corresponding one of the plurality of first pixels and a corresponding one of the plurality of second pixels, each of the plurality of first pixels includes a pixel in a first group and a pixel in a second group, each of the plurality of second pixels includes a pixel in a third group and a pixel in a fourth group, the pixel in the first group is connected to a gate line included in the plurality of gate lines and provided in an odd-numbered row, the pixel in the second group is connected to a gate line included in the plurality of gate lines and provided in an even-numbered row, the pixel in the third group is connected to a gate line included in the plurality of gate lines and provided in the odd-numbered row, the pixel in the fourth group is connected to a gate line included in the plurality of gate lines and provided in the even-numbered row, and between the pixel in the first group and the pixel in the second group, the controller is further configured to obtain the first degradation information from a different subpixel between the first subpixel and the second subpixel, and between the pixel in the third group and the pixel in the fourth group, wherein the controller is further configured to obtain the second degradation information from a different subpixel between the third subpixel and the fourth subpixel.

8. The display device according to claim 1, wherein the first subpixel has a first light-emitting element, the second subpixel has a second light-emitting element, the third subpixel has a third light-emitting element, the fourth subpixel has a fourth light-emitting element, and when the display panel is observed in a plan view, the first light-emitting element and the second light-emitting element are arranged side by side, and the third light-emitting element and the fourth light-emitting element are arranged side by side.

9. The display device according to claim 1, wherein the controller is further configured to perform an equal amount of correction on:

the input video signal in accordance with the first degradation information in order to generate the first video signal to be supplied to the first subpixel, and the input video signal in accordance with the first degradation information in order to generate the first video signal to be supplied to the second subpixel, and the controller is further configured to perform an equal amount of correction on:

the input video signal in accordance with the second degradation information in order to generate the second video signal to be supplied to the third subpixel, and the input video signal in accordance with the second degradation information in order to generate the second video signal to be supplied to the fourth subpixel.

10. The display device according to claim 1, wherein the first pixel is one of a pixel configured to emit a red light, a pixel configured to emit a green light, or a pixel configured to emit a blue light, and the second pixel is one of the pixel configured to emit the red light, the pixel configured to emit the green light, or the pixel configured to emit the blue light other than the first pixel.

* * * * *